(12) United States Patent
Goh et al.

(10) Patent No.: US 8,040,962 B2
(45) Date of Patent: Oct. 18, 2011

(54) CHANNEL RESPONSE CALCULATION IN AN OFDM RECEIVER

(75) Inventors: Wee Peng Goh, Temecula, CA (US); Jason Beck, Long Beach, CA (US); Raja Gosula, Salvador (BR)

(73) Assignee: Entropic Communications, Inc., San Diego, CA (US)

( * ) Notice: Subject to any disclaimer, the term of this patent is extended or adjusted under 35 U.S.C. 154(b) by 627 days.

(21) Appl. No.: 12/173,685

(22) Filed: Jul. 15, 2008

(65) Prior Publication Data
US 2009/0022252 A1     Jan. 22, 2009

Related U.S. Application Data

(60) Provisional application No. 60/950,111, filed on Jul. 16, 2007.

(51) Int. Cl.
*H04K 1/10* (2006.01)
*H04L 27/28* (2006.01)

(52) U.S. Cl. ......................................................... 375/260

(58) Field of Classification Search ................... 375/260
See application file for complete search history.

(56) References Cited

U.S. PATENT DOCUMENTS

| 2003/0063700 | A1* | 4/2003 | Tzou et al. | 375/376 |
| 2003/0227866 | A1* | 12/2003 | Yamaguchi | 370/208 |
| 2007/0058081 | A1* | 3/2007 | Kim et al. | 348/607 |

* cited by examiner

*Primary Examiner* — Dac Ha
*Assistant Examiner* — Tanmay Shah
(74) *Attorney, Agent, or Firm* — Bruce W. Greenhaus

(57) ABSTRACT

An efficient algorithm is described for use with OFDM receivers that characterizes the impulse response of a communication channel using frequency domain techniques that reduce computational and memory requirements, relative to time-domain cross-correlation methods, without sacrificing algorithm performance. An FFT engine is used to transform a time domain input sequence, the transformed sequence is multiplied by the conjugate of the expected sequence, the product of several sequences is averaged, then the FFT engine transforms the average back to a time domain sequence, the magnitude of which is the impulse response of the channel.

1 Claim, 1 Drawing Sheet

CHANNEL RESPONSE CALCULATION IN AN OFDM RECEIVER

RELATED APPLICATIONS

This application claims the benefit of U.S. Provisional Application No. 60/950,111, filed Jul. 16, 2007, the specification of which is herein incorporated by reference.

BACKGROUND

1. Field of Invention

The invention relates to characterizing communication channels.

2. Prior Art

In an orthogonal frequency division multiplex (OFDM) receiver, a real-time complex signal is typically converted to the frequency domain using a Fast Fourier Transform (FFT), recovering the orthogonal sub-carriers in the process. The recovered sub-carriers are then corrected with channel equalization, and frequency and time compensation. The sub carriers are demodulated to recover the data modulated onto the sub-carriers by the transmitter.

Characterization of the communication channel is needed to estimate the impairments to the transmitted signals passing through the channel. Channel response, also called channel transfer function, is the actual signal distorting characteristics of the communication channel. Channel estimation is the process of determining the channel response. Impulse response is the time domain version of the channel response. One characteristic of particular interest is the channel echo profile, the result of multiple signal paths due to signal reflections caused by the channel.

A known data sequence is transmitted through the channel that can be used by the receiver to compute the channel response.

It is common practice in communication systems to use time domain methods to compute the channel transfer function, which is represented by the channel impulse response. Computation of channel impulse response by conventional methods requires performing correlation between the received signal and the known sequence, which is costly to perform in software. Time domain cross-correlation techniques require computations that increase significantly with the channel length and sequence length, requiring computations proportional to the product of channel and sequence length. A large amount of data memory is required in the receiver to hold the received sequence during processing.

SUMMARY OF THE INVENTION

Channel characterization according to the present invention employs two FFT operations to process a known probe sequence that has been transmitted through the channel to compute the channel impulse response. This frequency domain processing technique computes the impulse response efficiently and reduces the hardware and soft are computational burden relative to time domain techniques. The process makes use of existing FFT computational resources in an OFDM receiver for an additional purpose to extract channel information in the frequency domain and further processes the channel information to obtain the channel impulse response.

The time domain signal received from a known channel probe message or data sequence is transformed to the frequency domain using an FFT operation. Then, the frequency domain complex conjugate of the known probe sequence is multiplied by the frequency domain version of the received signal. This produces the frequency domain response of the channel. The channel response calculated from several probe sequences can be averaged to reduce noise in the measurement. After computing the frequency domain response, this data is transformed to the time domain using another FFT operation. The magnitude of the FFT output produces a real-valued impulse response of the communication channel that passed the probe messages from the transmitter to the receiver. The result can be used to optimize the length of the cyclic prefix (CP) appended to OFDM symbols.

DETAILED DESCRIPTION OF THE INVENTION

Figure 1:
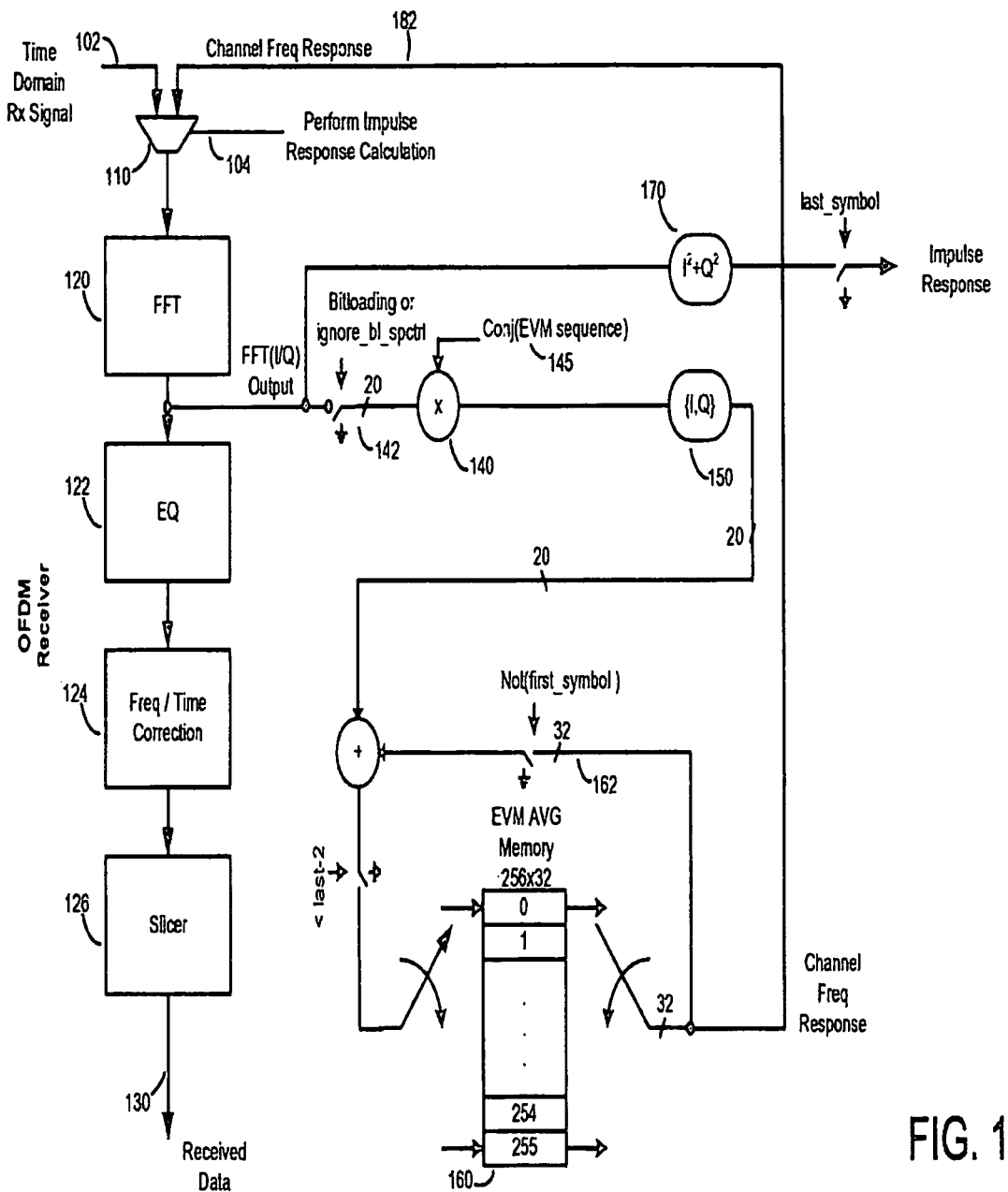
FIG. 1 shows a block diagram of a system for processing received information to determine channel impulse response.

FIG. 1 shows a block diagram of a system for processing received signals to determine the impulse response of the channel that the received signals passed through between the transmitter and receiver. An orthogonal frequency division multiplex (OFDM) receiver comprises signal processing blocks to process the time domain received signal into received data. A fast Fourier Transform (FFT) calculation engine 120 converts a signal between time domain and frequency domain. The FFT process can transform data between the time and frequency domains in both directions.

Equalization 122 performs frequency domain equalization in order to compensate for frequency domain distortions of the transmitted signal. At the start of every data packet, a known sequence of symbols is transmitted for the purposes of coarse estimating the channel response and the receiver uses the errors measured in the received sequence to adjust equalizer coefficients to compensate for errors in the subsequent data symbols. The equalization process is performed in two sequential steps: (1) coarse channel estimation and (2) channel equalization.

Channel estimation is the process of isolating and estimating the frequency domain errors introduced into the transmitted signal by the channel. Channel estimation is performed at the start of each packet by using information in a message preamble composed of a known sequence of symbols to derive a complex set of equalizer coefficients that provides an estimate of the frequency domain distortions of the transmitted signal.

Channel equalization is the process of applying the channel estimation coefficients determined at the start of a packet to subsequent OFDM symbols in order to compensate for frequency domain distortions introduced by the channel medium. After a channel estimate has been obtained for a given packet, channel equalization is performed by multiplying the received signal by the channel estimation coefficients to produce an equalized signal.

Frequency and time correction 124 corrects carrier offsets and symbol timing errors in the QAM profile of the received signal. Well-known techniques including a decision-directed frequency and time tracking loop can be used. A data slicer 126 converts the multi-level quadrature amplitude modulated (QAM) signals on each carrier into data bits. The data bits extracted from each carrier are concatenated to form the received data stream or data block.

In the present invention, data selector 110 selects between the received time domain signal 102 and a computed channel frequency response feedback signal 182. A control signal 104 selects the feedback signal to perform the impulse response calculation from the channel frequency response.

The present invention provides a precise characterization of channel response that can be used to prevent the introduction of symbol errors by the channel. The precise channel characterization is used in addition to the equalization 122 process described above. The calculation of channel response is performed as follows. The transmitter periodically sends a real-time signal with a known data sequence. The receiver recognizes the transmission of the known data sequence, which can be in the form of a dedicated channel probe message or data patterns embedded in other messages. The receiver compares the received signal with the known transmitted signal in order to characterize the channel response.

To characterize the response of the channel, the receiver first converts the received signal 102 into frequency domain using the FFT engine 120 of the OFDM receiver. When processing the input signal to compute the channel response, the output of the FFT 120 is processed directly, bypassing channel equalization 122 and frequency correction and time compensation 124 used for receiving data. The FFT output is represented as a series of complex numbers, each of which is comprised of an I and Q component.

The FFT 120 output is multiplied by the complex conjugate of the known transmitted sequence 145, called EVM sequence because it is used to compute the Error Vector Magnitude (EVM) as describe below, which is stored or generated in the receiver. This multiplication 140 yields the channel frequency response.

The channel response calculated from several identical probe sequences can be averaged in order to reduce noise in the measurement of the channel response. These sequences are averaged in the EVM Average Memory 160. Switch 142 governs which data symbols within each OFDM symbol of a received packet are added into the average of channel response under control of the signal ignore_bl_spctrl.

The echo profile probe used to determine the impulse response of the channel can be a pseudo-random sequence that is generated at the probe sender and an identical sequence is generated in the receiver for comparison with the sent probe. The sequence is the payload of a probe message and can be transmitted as a single-carrier, time-domain signal. The sequence can be generated by a well-known linear feedback shift register with generator polynomial $X^{10}+X^7+1$. The shift register of the sequence generator can be initialized at the start of each probe message, for example with 0x023, to create a predictable sequence. The receiver shift register is similarly initialized. The resulting starting sequence output from the PN generator is {1,1,0,0,0,1,0,0,0 ... }. The length of the sequence can comprise the first N values generated, for example, 1280 values. The sequence can be transmitted with pi/4-offset BPSK modulation using single carrier modulation at a sample rate of 50 MSPS.

Error Vector Magnitude (EVM) is a vector with both I and Q components that represent the distance and angle between the constellation point transmitted and the constellation point received in the QAM (I,Q) plane. EVM is computed using special probe packets on a per-carrier basis as the difference between the known transmitted sequence and the received sequence. EVM is used to determine the bitloading for each packet, that is, the order of magnitude modulation (16QAM, 64QAM, etc) that can be used reliably on each subcarrier. The data sequence used for the bitloading EVM calculation can be the same sequence used for channel characterization.

Data is processed and stored in the EVM AVG Memory 160 using sufficient range and resolution to avoid clipping signals or degrading the signal-to-noise ratio. For example, a 20-bit wide path carries a 10-bit representation for I and Q data. Number representation can be signed two's-complement or other format.

In a static environment, where the channel response is not varying significantly over time, the results from subsequent FFT blocks can be aggregated, or averaged, to reduce system noise. This produces the average channel frequency response. For example, a memory array 160 of 256 locations can be used to store the running sum of each sub carrier calculation. Switch 162 disables the feedback from the memory output during the first symbol to be summed to effectively reset the average. If the switch 162 is set to enable the feedback path for the first symbol of subsequent packets, the averaging occurs across several different packets.

Operation 150 {I,Q} signifies that the I and Q components of the complex product of the conjugate EVM sequence and the frequency transformed received sequence for each subcarrier are kept separate when they are stored and averaged separately in memory 160.

After the desired number of symbols is averaged, the average channel frequency response result stored in EVM Average Memory 160 is passed on feedback path 182 through the FFT via data selector 110 which is controlled by control signal 104. This final FFT processing step converts the channel frequency response to an impulse response. Block 170 computes the magnitude of the impulse response ($I^2+Q^2$) from the complex result of the final FFT pass. The impulse response is a sequence or array of values.

The impulse response can then be processed by an embedded processor or host processor to extract information about the transmission channel such as time delay, delay spread, relative attenuation, and other characteristics. Subsequent processing is simplified using the invention because autocorrelation does not need to be performed by software. The hardware performs the equivalent of autocorrelation when the conjugate EVM sequence is multiplied by the received sequence and the accumulated data representing channel frequency response is passed through the FFT to produce the channel impulse response. Path characteristics such as relative attenuation of signal path and time delay can also be derived. The path characteristics are used to determine packet parameters such as delay, echo compensation factors, and other characteristics that can be used to prevent errors from being introduced into packets by transmitter, channel, or receiver characteristics. One significant echo compensation factor is cyclic prefix, which is a repetition of a certain portion from the end of the OFDM symbol that is placed at the start of the OFDM symbol. The prefix time, or length, is a function of the multipath component of the signal determined by the channel estimation according to the present invention The present invention produces a high-precision estimate of the channel which can be used to prevent, reduce, or eliminate transmission signal and data errors.

Using this frequency-domain technique has the following advantages:

1. It reduces the computational burden from $O(n^2)$ to $O(n*\log(n))$ where the function $O(x)$ is defined as the order of x. In other words, the frequency-domain technique reduces the number of computations from a function of $n^2$ to a function of $n*\log(n)$.
2. It re-uses the existing FFT hardware
    a. computations are performed in hardware at data rates which are orders of magnitude faster than can be achieved in software b. memory required to estimate channel impulse response is reduced by more than a factor of 10 compared to a software implementation of a similar algorithm
c. functionality (logic) added to reuse existing OFDM receiver hardware is negligible The mathematical proof of the method employed by the invention is as follows:

Receive Signal 102

$$s_{rx}(t) = s_{tx}(t) \otimes h(t)$$

where h(t) is the channel characteristic.

After FFT:

$$s_{rx}(t) \leftrightarrow S_{rx}(f)$$

where $$S_{rx}(f) = S_{tx}(f)H(f)$$

After conjugating with the known transmit sequence, $$S_{rx}(f)\overline{S_{tx}(f)} = S_{tx}(f)H(f)\overline{S_{tx}(f)}$$

$$S_{rx}(f)\overline{S_{tx}(f)} = H(f)$$

Taking the second FFT:

$$H(f) \leftrightarrow h(t)$$

What is claimed is:

1. A device for computing the impulse response of a communication channel comprising:
   an FFT engine for computing the FFT of an input sequence to produce an output sequence;
   a data selector feeding the FFT engine to select between an input signal and a feedback path;
   a multiplier that multiplies the FFT output sequence by a predetermined Error Vector Magnitude (EVM) sequence;
   an averaging memory to average the multiplier output, the averaging memory feeding the feedback path;
   a magnitude calculator for computing the magnitude of complex numbers coupled to the FFT engine output;
   wherein when the data selector selects the input signal, the averaging memory averages the product of the EVM sequence and the FFT of the input signal, and when the data selector selects the feedback path, the FFT engine computes the FFT of the averaged multiplier output and the magnitude calculator computes the magnitude of the FFT output, to produce the impulse response of the communication channel.

* * * * *